Patented Aug. 9, 1949

2,478,191

UNITED STATES PATENT OFFICE 2,478,191

REACTION PRODUCTS OF p-AMINOBENZENESULFONAMIDES AND VASOCONSTRICTOR AMINES

William F. Hamilton, Altadena, and Melvin F. George, Jr., and Eli Simon, Los Angeles, Calif., assignors to Frederick M. Turnbull, Los Angeles, Calif.

No Drawing. Application June 2, 1942,
Serial No. 445,514

12 Claims. (Cl. 260—239.6)

This application is a continuation-in-part of our application Serial No. 411,718, filed September 20, 1941, now Patent No. 2,361,624.

This invention relates to pharmaceuticals for local application in the treatment of infections, especially sinusitis.

It has been found that the local application of certain sulfanilamide-type compounds and N-alkali (i. e., alkali-metal and alkaline-earth-metal) salts thereof is highly effective in the treatment of staphylococcic, pneumococcic, and streptococcic infections of the sinuses, eyes, and ears, as well as in the treatment of conjunctivitis, impetigo, and similar skin infections, and ear discharges which contain (and are probably due to) organisms of the diphtheroid and gonococcus types. Thus, the local application of a 5% aqueous solution of sodium sulfathiazole is spectacularly effective in the treatment of both acute and chronic sinusitis, marked improvement being obtained even in cases of long-standing staphylococcic and streptococcic infections which are extremely resistant to control by other medicinal agents. In treating sinusitis, the aqueous solution of sodium sulfathiazole is introduced into the sinuses, e. g. by means of a sprayer or dropper; or the sodium sulfathiazole is incorporated into an aqueous-jelly and applied in that form.

It is the object of this invention to provide more effective pharmaceuticals for local application in the treatment of infections, and methods of preparing them; and it is a special object of this invention to provide more effective pharmaceuticals for local application in the treatment of sinusitis.

(As employed herein, the term "para-amino benzene sulfonamides," or "sulfanilamido compounds" or "sulfanilamide-type compounds" embraces sulfanilamide and the chemo-therapeutic derivatives and substition products thereof, containing the radical

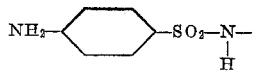

inter alia, the sulfanilamido-pyridines (e. g., sulfapyridine), the sulfanilamido-thiazoles (e. g., sulfathiazole) and sulfanilamido-diazines (e. g., 2-sulfanilamido-pyrimidine); and the term "vasoconstrictive amines" embraces such amines and the acid addition salts thereof including the compound (α - hydroxy-β-methylamino-propyl) - benzene, commonly known as ephedrine, and the various other phenylalkylamines having a local vasoconstrictor action similar to that of ephedrine, inter alia:

(β-Methylamino - ethyl) - benzene, or amphetamine;

(α - Hydroxy - β-methylamino - ethyl) -3,4 - dihydroxy-benzene, or epinephrine;

(Methylamino-acetyl) -3,4-dihydroxy-benzene, or kephrine;

(α-Hydroxy-β-methylamino - ethyl) -3-hydroxy-benzene, or neo-synephrine;

(α-Hydroxy-β-methylamino - ethyl) -4-hydroxy-benzene, or synephrine;

(α-Hydroxy-β-amino-propyl) - benzene, or propadrine;

(α-Hydroxy-β-amino - propyl) - 3,4 - dihydroxy-benzene, or cobefrine;

(β-Amino-propyl) -4-hydroxy-benzene, or paredrine;

(β-Methylamino - propyl) - benzene, or desoxyephedrine.

The term "alkyl" as used in the claims is intended to embrace those aliphatic radicals having a hydroxyl group or oxygen atom substituting hydrogen, as well as those having only hydrogen in the corresponding position, and, similarly, the term "phenyl" is used to indicate the benzene ring with or without OH groups. Thus, the above vasoconstrictive amines, including those containing hydroxyl or keto groups, are all phenylalkyl amines, and because of the carbon attachment they are designated in the claims as C-phenylalkyl amines. They are also conventionally considered as phenylethyl amine derivatives.

Also, for convenience, the symbol STC is employed in the specification to represent a member of the group consisting of (1) sulfanilamide-type compounds capable of forming N-alkali salts and (2) such salts, and the symbol VA to represent a member of the group consisting of vasoconstrictive amines and acid-addition salts thereof.

We have found: that the effectiveness of STC in treatments such as those indicated hereinbefore is enhanced by the local application therewith (to the inflamed and congested tissues) of VA; that there is in effect a synergism between STC and VA, since the vasoconstrictive activity of VA is enhanced many times in the presence of STC; that STC and VA interact to form new and highly-effective medicinal agents for local application in the treatment of infections, notably sinusitis; that compositions essentially comprising a reaction-product of STC and VA and excess or uncombined STC constitute exceptionally advantageous pharmaceuticals for local application in the treatment of infections, notably sinusitis; and that aqueous solutions containing a reaction-product of STC and VA with or without excess or uncombined STC may be stabilized by inclusion of water-soluble sulfites.

Where the term "reaction product" or similar term is used herein, it is intended to include, where necessary, not only the reaction product of a sulfonamide salt with a phenyl alkyl amine acid-addition salt, but also the addition product of a sulfonamide and a phenyl alkyl amine.

It is believed that the product formed by interaction of STC and VA is an amine-(acid-addition) or onium salt of the general formula

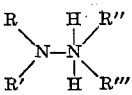

wherein

represents the anion of a sulfanilamide-type compound capable of forming an N-alkali salt, and

represents the cation of a compound formed by the addition of an acid to a vasoconstrictive amine. For example, it is believed that sodium sulfathiazole and (β-methylaminopropyl)-benzene hydrochloride, or desoxyephedrine hydrochloride, metathetically interact to form desoxyephedronium sulfathiazole; i. e.,

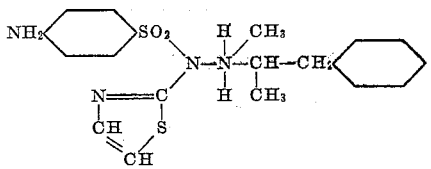

and NaCl (which, of course, is physiologically unobjectionable in the pharmaceuticals of this invention).

Such reaction products are therefore the $N^1$ salts of the sulfanilamido compounds and the vasoconstrictive amines. In the sulfanilamido compounds, the thiazole, pyridine, pyrimidine and diazine radicals and the corresponding hydrogen in the case of sulfanilamide are electro-positive radicals which render the compounds therapeutically active.

It is also believed that the formation of these onium salts is responsible for the apparent synergism exhibited by an admixture of STC and VA. It is not intended, however, that the invention shall be limited by this or any other theory or explanation.

The pharmaceuticals of this invention may be obtained essentially as follows: by merely admixing STC and VA, either in stoichiometric proportions or with the STC in excess; by dissolving STC and VA in an aqueous medium, either in stoichiometric proportions or with the STC in excess; by interacting STC and VA, either in stoichiometric proportions or with the STC in excess; or by admixing the desired proportions of STC with a reaction product of STC and VA. Should the pharmaceuticals be desired free of sodium chloride, they may be prepared by interacting an STC base (acid-form) and a VA base (alkaloid-base) in stoichiometric proportions, or the VA alkaloid base in excess. Pharmaceuticals embodying STC in excess or uncombined are preferred, since the amount of VA required for efficacious treatment is generally much less than that stoichiometrically equivalent to the optimum amount of the STC. Preferably, the aqueous-solution pharmaceuticals of this invention are stabilized, since aqueous solutions containing a reaction-product of STC and VA (and especially those containing STC in excess or uncombined) are not stable in the presence of air and/or sunlight. Thus, an aqueous solution containing STC in excess or uncombined may undergo a color change (indicative of deterioration) within a few hours after preparation, even without exposure to sunlight; and within a few minutes when exposed to sunlight; and an aqueous solution containing a reaction-product of STC and VA is not stable for the length of time normally elapsing between commercial production and therapeutic administration. It has been found that the stabilizing agents described (and claimed) in our copending application Serial No. 411,718, filed September 20, 1941, are effective for the stabilization of the pharmaceuticals of this invention. These stabilizing agents are the water-soluble sulfites, especially the alkali-metal sulfites, such as sodium sulfite. The alkali-metal sulfites are especially advantageous as stabilizing agents for the pharmaceuticals of this invention because they yield a buffer solution of pH approximately 8.3 to 10, which is compatible with the pH of the aqueous-solution pharmaceuticals of this invention. Thus, sodium sulfite in 2% concentration is effective as a stabilizer, and a 2% aqueous solution of sodium sulfite alone has a pH of 9.0 to 9.5. This feature is of substantial importance, since if the pH of the stabilizing agent is much lower than the pH of the solution to be stabilized, N-alkali salts of sulfanilamide-type compounds are decomposed (and the sulfanilamide-type compound is precipitated); and if the pH of the stabilizing agent is too high, for example above 11, the stabilized solution is so caustic as to make its use for physiological purposes inadvisable.

Optionally, there is incorporated in the stabilized aqueous solution a small amount (e. g., as little as 0.01%) of a mono- or polyhydric alcohol, such as glycerine, isopropyl alcohol, benzyl alcohol, and normal or secondary butyl alcohols. These compounds form with the sulfites a mutually protective system, which serves to increase substantially the effective life of the sulfite ion as a stabilizer. Optionally, also, a small amount of glycerine (up to about 10%) may be added to the solution, to increase the wetting of the treated tissue surfaces, minimize evaporation, and soften the tissues. Further, phenolphthalein or other coloring agent may be added to give the solution a pleasing color; and minute amounts of spearmint, wintergreen, and/or peppermint oils, with a carrier of vanilla, may be added to impart a pleasing odor to the solution.

The reaction-products of STC and VA, with or without the STC in excess or uncombined, are sufficiently stable in dry state to permit storage for the required periods. These dry pharmaceuticals (in crystalline or powder form) may be directly applied to the affected tissues, or dissolved in water or an aqueous medium made slightly alkaline with sodium hydroxide, for example, to increase its solubility, just prior to use. To obtain an increased salt concentration when used in an aqueous medium, it is necessary to maintain a sufficiently high pH to prevent the precipitation of the sulfanilamide-type compound. Thus, when using sulfathiazole as the sulfanilamide-type compound, the pH of the aqueous medium must be kept above 8.3. The reaction-products of STC and VA, with or without the STC in excess or uncombined, and stabilized aqueous solutions thereof, may also be incorporated into an aqueous-jelly pharmaceutical vehicle, to obtain the obvious advantages thereof.

The following examples are illustrative of the preparation of the pharmaceuticals of this invention.

Example 1

4 g. ephedrine is added to 550 cc. water, and the mixture is warmed until all the ephedrine is dissolved; then 2 g. sulfathiazole is added to the solution, and the solution is boiled until all of the sulfathiazole is dissolved; and on cooling, the compound ephedronium sulfathiazole is deposited as columnar crystals, having a melting point of 206–206.5° C. (corrected).

The compound may be employed per se as a pharmaceutical, or it may be embodied in pharmaceutical preparations of the types indicated hereinbefore.

Example 2

To 91.8 cc. cool, freshly-distilled water is added 3 cc. glycerine, and then 2 g. sodium sulfite, and the mixture is agitated until all the sodium sulfite is dissolved. Two and one-half grams of sodium sulfathiazole is then added, and after it is completely dissolved, 0.2 g. ($\alpha$-hydroxy-$\beta$-methylamino-ethyl)-3-hydroxy-benzene hydrochloride, and 0.5 cc. of an ethanol solution of coloring and flavoring substances are added. Should an initial lower pH be desired, e. g., approximately 8.6, dilute hydrochloric acid or suitable buffer salts may be slowly added, with stirring, until the desired degree of alkalinity is obtained. The prepared solution is then heat sterilized, and after cooling and filtering through a No. 4 or No. 5 porosity fritted glass filter, it is ready for use (or for storage, against which it is preferably packaged in amber or brown glass bottles, with synthetic-resin caps).

The solution, whose alkalinity was further decreased by the addition of suitable acidic substances, as stated previously has a pH of about 8.6, and hence may be applied to the eyes without danger of irritation due to excessive alkalinity. The sodium sulfathiazole content may (advantageously for some treatments) be increased to 5%; and the concentration of the sodium sulfite may be varied considerably, the optimal amount being directly correlated with the concentration of sodium sulfathiazole, the severity of the oxidizing conditions to which the solution will be subjected, and the length of time during which it is anticipated that stabilization will be required. In varying the proportions of the ingredients, however, the pH is preferably maintained above about 8.3, since at lower values there may be precipitation as the result of the decomposition of sodium sulfathiazole; but, on the other hand, the pH should not be allowed to exceed about 9 when used in the eyes, or about 11 when used on other parts of the body, to prevent possible injury to the tissues.

Example 3

The desired proportions of sodium sulfathiazole and desoxyephedrine hydrochloride are admixed in the dry state and formed into pellets of such size as to give a solution of the desired concentration when added to a specified quantity of water.

Example 4

The following are dissolved in 93.5 cc. freshly-distilled water, preferably in the manner detailed in Example 2:

| | | |
|---|---|---|
| Sodium sulfathiazole | grams | 2.5 |
| ($\alpha$-hydroxy-$\beta$-amino propyl) benzene hydrochloride | grams | 0.05 |
| Sodium sulfite | do | 2 |
| Glycerine | cc | 1.5 |
| Coloring and flavoring substances in ethanol | cc | 0.5 |

Dilute hydrochloric acid may be added to a pH of approximately 8.6 if desired, after which the solution is sterilized and filtered. The "Propadrine" hydrochloride (($\alpha$-hydroxy-$\beta$-amino propyl) benzene hydrochloride) concentration must of a necessity be kept low due to the limited solubility of the propadronium sulfathiazole compound. However, even in this concentration, effective vasoconstrictive action is obtained due to the increased activity of the "onium" compound.

Example 5

The "Propadrine" hydrochloride of the preceding example may be replaced by 0.125 g. of desoxyephedrine hydrochloride or 0.2 g. of ($\alpha$-hydroxy-$\beta$-methylamino-ethyl)-3-hydroxy-benzene hydrochloride to obtain similarly increased efficacious and stable pharmaceuticals.

Example 6

An aqueous solution is prepared containing about 2.5 to 5% sodium sulfathiazole, about 2% sodium sulfite, about 3–5% glycerine, about 0.125% desoxyephedrine hydrochloride; and the solution is made gelatinous by incorporation in a methyl-cellulose preparation stable within a pH range of 2–12, which is obtained by adding about 3% of a high-viscosity methyl-cellulose (commercially known as "XX High Vis") to boiling water, and cooling to room temperature with or without agitation. The sodium sulfathiazole solution is then cooled to about 0° C. and added to this methyl-cellulose preparation (at room temperature); and water at about 0° C. is added to obtain the desired volume, and the resulting product is agitated and maintained at a low temperature until a clear solution is obtained. The resulting product is a gelatinous mass with the solution (of sodium sulfathiazole) uniformly distributed therein, and is a semifluid (of the consistency of No. 1 cup grease) at body temperature.

The viscosity of the product is determined by the nature of the methyl-cellulose used and its concentration; and these may be varied to obtain products ranging from viscous liquids to semi-solids at body temperature. The stability of the gelatinous form is comparable with that of the stabilized solution of sodium sulfathiazole embodied in it.

Example 7

There may be incorporated with such stabilized solution or gels of desoxyephedronium sulfathiazole, or other "onium" salts, an amount of another sulfanilamido compound, or its sodium salt, required to obtain new and varied therapeutic properties, which differ from those obtainable from solution of any single sulfanilamido compound.

An example of such a solution is:

| | | |
|---|---|---|
| Sodium sulfathiazole | grams | 1.25 |
| Sodium sulfanilamide | do | 1.25 |
| Sodium sulfite (anhydrous) | do | 2.0 |
| dl-Desoxyephedrin hydrochloride | do | 0.125 |
| Glycerine | cc | 1.0 |
| Coloring and flavoring substances in ethanol | cc | 0.5 |
| Distilled water to make | cc | 100 |

Example 8

Sodium sulfathiazole is dissolved in water, and ephedrine hydrochloride is added. After warming and cooling, the pH of the final solution should be above 8.3 to prevent precipitation of the sulfathiazole. Upon standing precipitation occurs. The precipitate, a crystalline substance in the form of long columns, melts at 206–206.5° C. (corrected) and decomposes very rapidly above this temperature. This crystalline substance has been shown to be ephedronium sulfathiazole, which is composed of equi molal quantities of sulfathiazole and ephedrine.

Example 9

Sodium sulfathiazole is dissolved in water, and desoxyephedrine hydrochloride is added. Again, the pH of the final solution should be above 8.3. Upon precipitating, stem-like crystals with branches are obtained. It is believed that this compound is desoxyephedronium sulfathiazole. The desoxyephedronium sulfathiazole compound is far more soluble than the ephedronium sulfathiazole compound and may therefore be used in greater concentration (aqueous medium) without danger of precipitation.

Example 10

Propadronium compound may also be similarly prepared by interacting propadrine hydrochloride with sodium sulfathiazole. The resulting propadronium sulfathiazole crystallizes in the form of needles having a melting point of 199° C. (corrected).

The fact that each of the foregoing examples is concerned with sulfathiazole or sodium sulfathiazole is not to be construed as limitative of applicants' invention, since sulfathiazole and sodium sulfathiazole are intended to be illustrative of the members of the group consisting of (1) sulfanilamide-type compounds capable of forming N-alkali salts and (2) such salts. Thus, sodium sulfadiazine may be substituted for the sodium sulfathiazole in the same proportion in each of the foregoing examples to obtain pharmaceuticals having therapeutic value and stability of the same order as those of these examples.

The invention may be variously otherwise embodied within the scope of the appended claims.

We claim as our invention:

1. As a new chemical compound, an $N^1$ salt of: a sulfanilamido compound having the linkage

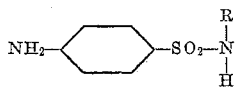

where R is a radical which, when combined with the sulfanilamido radical, produces a compound having therapeutic use; and a C-phenyl alkylamine.

2. The chemical compound defined in claim 1 wherein R is a hetero N-containing monocyclic radical.

3. As a new chemical compound, an $N^1$ salt of a sulfanilamido diazine and a C-phenyl alkylamine.

4. As a new chemical compound, an $N^1$ salt of 2-sulfanilamido-pyrimidine and a vasoconstrictor having a salt-forming amine group.

5. As a new chemical compound, an $N^1$ salt of a sulfanilamido thiazole and a C-phenyl alkylamine.

6. As a new chemical compound, an $N^1$ salt of sulfathiazole and a vasoconstrictor having a salt-forming amine group.

7. As a new chemical compound, an $N^1$ salt of 2-sulfanilamido-pyrimidine and desoxyephedrine.

8. As a new chemical compound, an $N^1$ salt of sulfathiazole and desoxyephedrine.

9. The crystalline reaction product of sulfathiazole and a C-(hydroxyphenyl)-alkylolamine vasoconstrictor base.

10. The chemical compound of sulfathiazole with neo-synephrine.

11. As a new chemical compound, an $N^1$ salt of: a sulfanilamido compound having the linkage

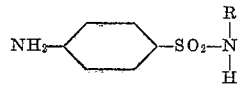

wherein R is a radical which, when combined with the sulfanilamido radical, produces a compound having therapeutic use; and a vasoconstrictor having a salt-forming amine group.

12. As a new chemical compound, an $N^1$ salt of: a benzene sulfonamido compound having the linkage

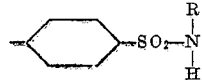

and having an amino group at the para position of the benzene ring, and where R is a radical which, when combined with the sulfonamido structure having said amino group, produces a compound having therapeutic use; and a vasoconstrictor having a salt-forming amine group.

WILLIAM F. HAMILTON.
MELVIN F. GEORGE, JR.
ELI SIMON.

REFERENCES CITED

The following references are of record in the file of this patent:

UNITED STATES PATENTS

| Number | Name | Date |
|---|---|---|
| Re. 19,569 | Goldberg | May 14, 1935 |
| 2,013,524 | Painter | Sept. 3, 1935 |
| 2,047,144 | Kharasch | July 7, 1936 |
| 2,144,395 | Snyder | Jan. 17, 1939 |
| 2,187,467 | Stuart | Jan. 16, 1940 |
| 2,245,539 | Warnat | June 10, 1941 |
| 2,294,937 | Ruskin | Sept. 8, 1942 |
| 2,339,788 | Lee | Jan. 25, 1944 |
| 2,361,624 | Hamilton et al. | Oct. 31, 1944 |

FOREIGN PATENTS

| Number | Country | Date |
|---|---|---|
| 114,894 | Australia | Apr. 2, 1942 |
| 676,436 | Germany | June 3, 1939 |

OTHER REFERENCES

Turnbull, J. Amer. Med. Assoc., vol. 116, pp. 1899 and 1900 (1941).

Squibb Abstract Bulletin C-347 (December 4, 1940) [Abstracting an Advertisement by Laboratories A. Bailly in Presse Med., vol. 48, A-588 (1940), # 53].